(12) United States Patent
Ananthanarayanan et al.

(10) Patent No.: US 10,338,821 B2
(45) Date of Patent: Jul. 2, 2019

(54) MEMORY CONTROLLER FOR HIGH LATENCY MEMORY DEVICES

(71) Applicant: SMART Modular Technologies, Inc., Newark, CA (US)

(72) Inventors: Rajesh Ananthanarayanan, Mountain View, CA (US); Jinying Shen, San Ramon, CA (US); Amir Alavi, Irvine, CA (US)

(73) Assignee: SMART Modular Technologies, Inc., Newark, CA (US)

( * ) Notice: Subject to any disclaimer, the term of this patent is extended or adjusted under 35 U.S.C. 154(b) by 92 days.

(21) Appl. No.: 15/285,305

(22) Filed: Oct. 4, 2016

(65) Prior Publication Data

US 2018/0095661 A1    Apr. 5, 2018

(51) Int. Cl.
    *G06F 3/06* (2006.01)
(52) U.S. Cl.
    CPC .............. *G06F 3/061* (2013.01); *G06F 3/064* (2013.01); *G06F 3/0659* (2013.01); *G06F 3/0673* (2013.01)
(58) Field of Classification Search
    CPC ........ G06F 3/061; G06F 3/064; G06F 3/0659; G06F 3/0673
    See application file for complete search history.

(56) References Cited

U.S. PATENT DOCUMENTS

| 9,477,587 | B2 * | 10/2016 | Wong | ................... G06F 12/0207 |
| 2010/0250836 | A1 | 9/2010 | Sokolov et al. | |
| 2012/0066434 | A1 | 3/2012 | Zitlaw | |

(Continued)

FOREIGN PATENT DOCUMENTS

WO    WO2014007984    1/2014

OTHER PUBLICATIONS

World Intellectual Property Organization, Application No. PCT/US17/53846, International Search Report dated Jan. 5, 2018.

(Continued)

*Primary Examiner* — Aracelis Ruiz
(74) *Attorney, Agent, or Firm* — Wong & Rees LLP; Kirk D. Wong (57) ABSTRACT

Approaches, techniques, and mechanisms are disclosed for improving the performance of memory controllers for memory devices. A system may have a memory controller that interfaces with a memory device to store or retrieve information. When the system needs to retrieve information from the memory device, the memory controller sends an address and a command to instruct the memory device to read the information stored at the address. The memory device reads the information, and after a specific amount of time, the memory device sends the information to the memory controller. According to an embodiment, "dummy" data is sent first prior to the availability of the data read out of the memory devices, while waiting for the requested data to be accessed, and then the actual data is sent immediately following the dummy data. According to an embodiment, a geometry of a memory device has only one column of memory cells that are used to store information. The memory device with only one column in an embodiment does not require decoding of a column address. As such, the read latency of the memory device is significantly reduced.

18 Claims, 6 Drawing Sheets

(56) References Cited

U.S. PATENT DOCUMENTS

| | | |
|---|---|---|
| 2014/0006730 A1 | 1/2014 | Zain et al. |
| 2014/0104943 A1 | 4/2014 | Chen et al. |
| 2015/0254009 A1* | 9/2015 | Eguchi ................ G06F 3/0619 711/103 |

OTHER PUBLICATIONS

World Intellectual Property Organization, Application No. PCT/US17/53846, Pending Claims as of Jan. 5, 2018.

* cited by examiner

MEMORY CONTROLLER FOR HIGH LATENCY MEMORY DEVICES

TECHNICAL FIELD

Embodiments relate generally to a computing system, and, more specifically, to techniques for memory control.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Electronics and electronic computing systems are continually developed with greater computing performance for a given space and within a given power profile. Additionally, as more and more functionality moves to the cloud, scalability within a short time frame becomes increasingly important. Within the systems, the integrated circuit and memory modules are building blocks used to power cloud-supported and other applications for front-end and back-end usage in products such as automotive vehicles, computers, cell phone, intelligent portable military devices, aeronautical spacecraft payloads, and a vast line of other similar products supporting many complex functions.

Products compete in world markets and attract many consumers or buyers in order to be successful. It is important for products to continue to improve in features, performance, and reliability while reducing product costs and product size, while still being available quickly for purchase by the consumers or buyers. Additionally, it is important for the computing systems to have as much power as possible so that less time is required to perform calculations, ultimately reducing the time an end-user waits for a response.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
 1.0. General Overview
 2.0. System Overview
 3.0. Functional Overview
  3.1. Read Transaction with Dummy Data
  3.2. Read Transaction with Multiple Bursts
  3.3. Read Transaction with Multiple Rows
  3.4. Single-Columned Memory Device
  3.5. Example Process Flow Utilizing Dummy Data
 4.0. Example Embodiments
 5.0. Extensions and Alternatives

1.0. General Overview

Approaches, techniques, and mechanisms are disclosed for improving the performance of memory controllers for memory devices. A system may have a memory controller that interfaces with a memory device to store or retrieve information. When the system needs to retrieve information from a physical location of the memory device, the memory controller sends an address that points to the physical location and a command to instruct the memory device to read the information stored at the address.

The memory device reads the information, and then, after a specific amount of time, the memory device sends the information to the memory controller. The time it takes for the memory device to send data to a system or a memory controller is known as a read latency. Existing memory controllers are not designed to handle a high read latency of advanced memories, particularly while these advanced memories are increasingly used in the system. For upcoming advanced memory devices (e.g., flash memory, etc.), read operations can be slower initially when reading data out of the memory devices, with a high initial read latency of typically at least 32 clock cycles. Thereafter, however, the data may continue to be read with minimal latency. Nonetheless, such a high initial read latency causes operational or performance issues to a computing device in the system. For example, the system may be designed around the assumption that latency will be the same regardless of when the data is read, and the timing parameters of the system with respect to the memory must be less than optimal to accommodate the high initial read latency. Whereas, the timing parameters could be much more optimal if the high initial read latency could be avoided.

According to an embodiment, "dummy" data is sent first prior to the availability of the data read out of the memory devices, while waiting for the requested data to be accessed, and then the actual data is sent immediately following the dummy data. In this manner, the urgency of providing the initial data within a timeframe expected for the system's timing parameters is alleviated, thereby allowing the memory devices to be utilized with faster timing parameters than would be possible conventionally.

According to an embodiment, when a computing device requests read data from a memory module, a memory controller of the computing device sends an address and a read command to a register device of the memory module. The register device buffers or registers the address and the read command and then forwards the address and the read command to memory devices. The memory devices read data at the address. While the data is being read from the memory devices, the register device sends a burst or a sequence of consecutive dummy data to the computing device so that the computing device does not have to wait for a duration that equals to a read latency of the memory devices. As such, the memory controller satisfies timing constraints of the computing device, while allowing the memory devices to have time to retrieve and stream the data in succession.

According to an embodiment, a geometry of a memory device has only one column of memory cells that are used to store information. Unlike other memory devices with multiple columns, the memory device with only one column in an embodiment does not require decoding of a column address. As such, the read latency of the memory device is significantly reduced. In addition to the dummy data strategy, the single column geometry addresses the longer read latency problem.

2.0. System Overview

Figure 1:
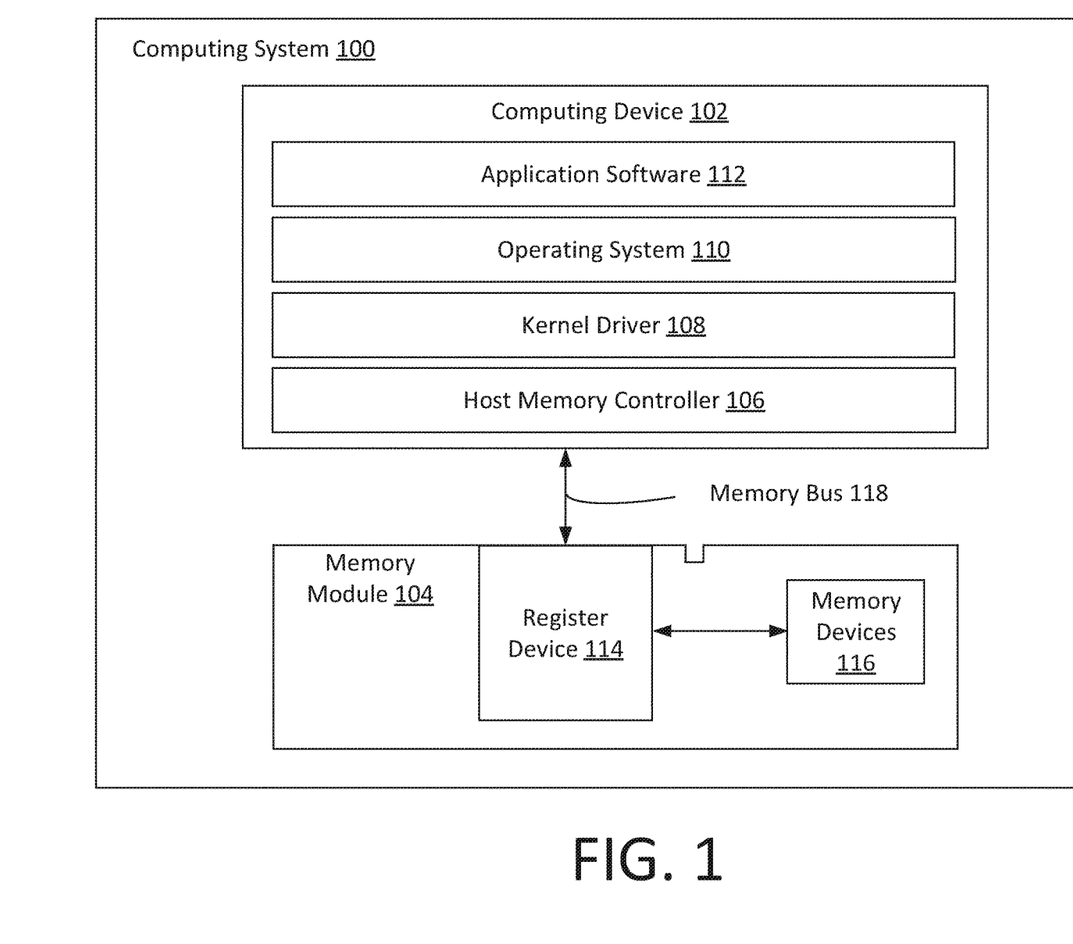
FIG. 1 is an illustrative view of an example computing system, according to an embodiment.

FIG. 1 is an illustrative view of various aspects of an example computing system 100 in which the techniques described herein may be practiced, according to an embodiment. The illustrative view depicts an example of a system block diagram of computing system 100. Computing system 100 can represent, without limitation, personal computers (PCs), desktop computers, laptops, notebooks, workstations, servers, diskless workstations and thin clients, hybrid computers, mainframes, supercomputers, microcomputers, nanocomputers, "smart" home appliances, consumer electronics, display devices, entertainment systems, etc. Computing system 100 includes a memory module 104 interfacing with a computing device 102.

Computing device 102 includes any combination of hardware and software, configured to implement various logical components. For example, computing device 102 may include one or more memories storing instructions for implementing the various components, one or more hardware processors configured to execute the instructions stored in the one or more memories, and various data repositories in the one or more memories for storing data structures utilized and manipulated by the various components. For illustrative purposes, only one computing device 102 is shown, although it is understood that computing system 100 can include any number of computing devices 102 that can be configured to connect and communicate with each other.

Computing device 102 includes hardware components, such as a host memory controller 106. Host memory controller 106 is configured to communicate with memory module 104 to store data into memory module 104 or retrieve data from memory module 104. Computing device 102 may further include software components, such as a kernel driver 108, an operating system 110, and application software 112.

Kernel driver 108 operates as an interface between operating system 110 and host memory controller 106. Kernel driver 108 executes in a kernel mode on an underlying hardware. Kernel driver 108 manages a memory and how the memory is paged using for example, a paged pool, non-paged pool, etc. Kernel driver 108 may operate with low level hardware bits, such as interrupts and interrupt request levels (IRQLs).

Operating system 110 is a set of software that manages hardware and software resources, and provides common services for various application software 112. Operating system 110 may be a component of system software in computing system 100. Application software 112 is a set of executable software code that is written for and installed to run under operating system 110.

Memory module 104 includes a register device 114 and memory devices 116. Register device 114 interfaces with host memory controller 106 and memory devices 116. Register device 114 interfaces with host memory controller 106 via a memory bus 118. Register device 114 receives requests from host memory controller 106 for access to memory devices 116 to write data to memory devices 116 or read data from memory devices 116.

Register device 114 may interface with a variety of types of memory devices 116 using a variety of different protocols. In an embodiment, register device 114 may be referred to as a slave custom module, because register device 114 functions as a slave device that receives requests from host memory controller 106 for access to memory devices 116. Register device 114 may be customized or specifically designed to have functionality that existing memory controllers do not have, such as at least a feature that is capable of sending dummy data to computing device 102 while waiting to receive read data from memory devices 116 during a prolonged read latency (e.g. an initial read latency) of memory devices 116. In an embodiment, memory devices 116 may be used as a cache memory for computing device 102 to store information for host memory controller 106, kernel driver 108, operating system 110, application software 112, or any other component of computing device 102.

Examples of memory devices 116 may include, without limitation, memory integrated circuits (ICs), volatile memory, non-volatile memory, heat-assisted magnetic recording and patterned media, and so forth. Memory devices 116 may include, without limitation, random-access memory (RAM), dynamic RAM (DRAM), Flash, crossbar memory, embedded Multi-Media Controller (eMMC), resistive RAM (RRAM), phase-change RAM (PRAM), magnetoresistive RAM (MRAM), ferroelectric RAM (F-RAM or FeRAM), Millipede memory, nano-RAM, silicon-oxide-nitride-oxide-silicon (SONOS), conductive-bridging RAM (CBRAM), molecular memory, double data rate (DDR) synchronous dynamic random-access memory (SDRAM), DDR type two (DDR2) SDRAM, DDR type three (DDR3) SDRAM, DDR type four (DDR4) SDRAM, NOR Flash, vertical NAND (V-NAND) memory, NAND Flash, floating-gate transistors, single-level cell (SLC) devices, triple-level cell (TLC) devices, multi-level cell (MLC) devices, or combinations thereof.

In an embodiment, register device 114 is implemented using a block access protocol. The block access protocol may include a mechanism for accessing data using a contiguous block of consecutive locations or addresses in a memory device 116. For example, register device 114 may access a predefined number of bytes or words that are stored in consecutive addresses of memory devices 116.

Computing system 100 is but one example of a system in which the techniques described herein may be practiced. Other systems in which the techniques described herein may be practiced may comprise fewer or additional elements in varying arrangements.

3.0. Functional Overview

3.1. Read Transaction with Dummy Data

Figure 2:
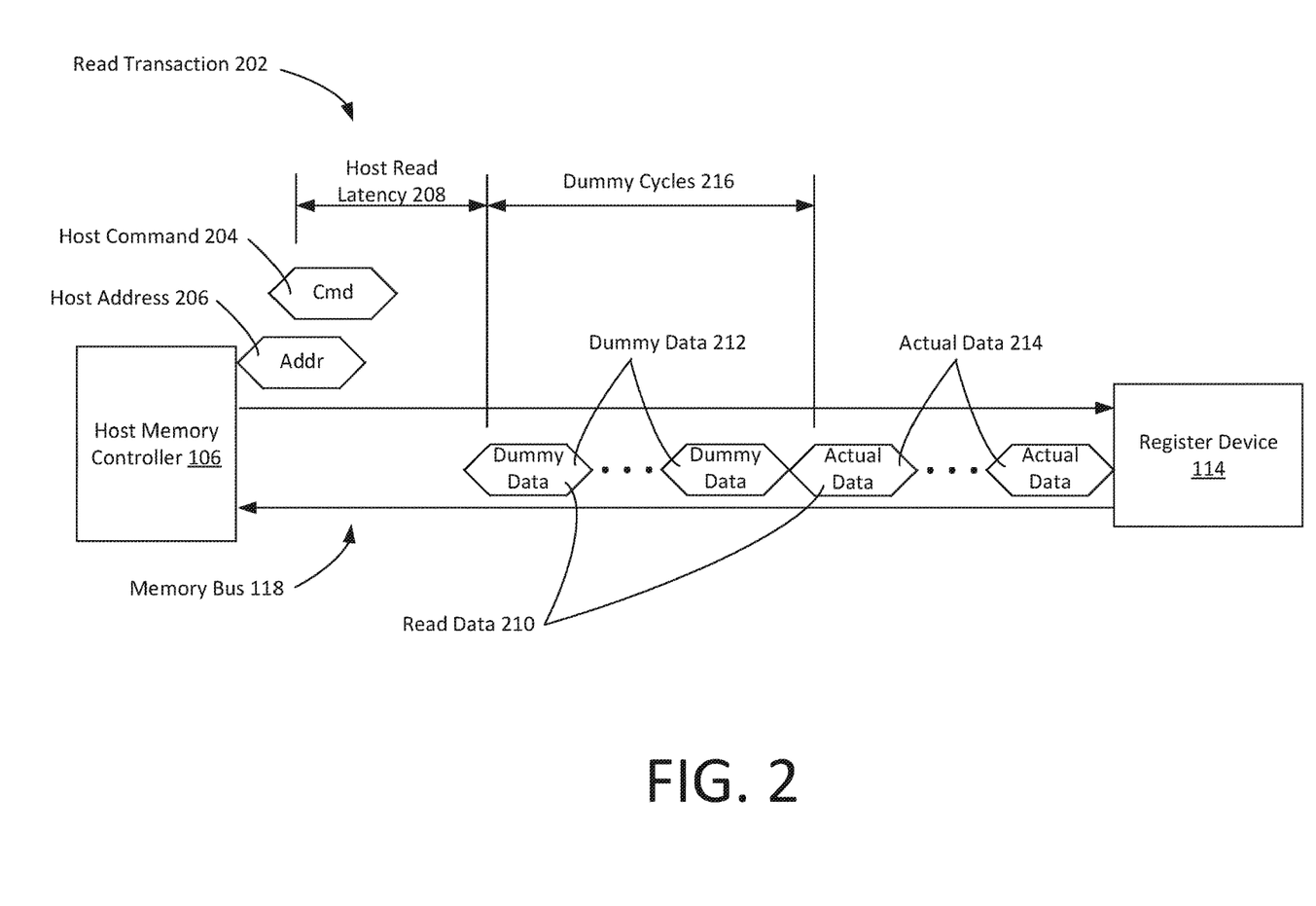
FIG. 2 is an illustrative view of an example read transaction on a memory bus, according to an embodiment.

FIG. 2 is an illustrative view of an example read transaction 202 on memory bus 118, according to an embodiment. FIG. 2 is only one example of a manner in which a read transaction may be conducted in accordance with the described techniques. In other embodiments, read transactions may be conducted using process flows that include fewer or additional elements, with different timings and/or arrangements. The example depicts read transaction 202 between host memory controller 106 and register device 114. Read transaction 202 initiates with host memory controller 106 sending a host command 204, denoted as "cmd", as a request to register device 114 to retrieve data from memory devices 116.

Host memory controller 106 sends, in association with host command 204, a host address 206 to register device 114. Register device 114 may buffer or register host command 204 and host address 206 before sending them to memory devices 116. For example, register device 114 may register host command 204 and host address 206 using flip-flops (e.g., D flip-flops, or any other latch or storage devices) and outputs of the flip-flops may be connected to address and command input ports of memory devices 116.

For example, host address 206 may include a physical address of memory devices 116. Also, for example, a physical address may identify a bank group, a bank, a row, and/or a column of a memory device. Further, for example, host address 206 may not be a logical address of a memory address space of computing device 102.

Host address 206 may point to, for example, the next physical address to be accessed in a memory address space. Host address 206 may be automatically incremented by host memory controller 106 after a host command 204 has been sent to register device 114.

For illustrative purposes, host address 206 and host command 204 are shown with one occurring after another, although it is understood that host address 206 and host command 204 can be sent in any manners. For example, host address 206 and host command 204 can be sent in the same clock cycle.

After register device 114 receives host command 204 from host memory controller 106 for read transaction 202, register device 114 sends specific control signals to memory devices 116 and waits for memory devices 116 to retrieve data. Host memory controller 106 may be implemented such that host memory controller 106 expects to receive data by a specific amount of time, such as a host read latency 208, after host memory controller 106 sends host command 204 to register device 114 for read transaction 202. Host read latency 208 may represent, for example, a maximum duration of time host memory controller 106 expects the retrieval of data from register device 114 to take when register device 114 receives a given host command from host memory controller 106 for a read transaction.

After register device 114 receives host command 204 for read transaction 202 from host memory controller 106, before or at the time the host read latency 208 has elapsed, register device 114 sends read data 210 to host memory controller 106. However, memory devices 116 may take longer than host read latency 208 to retrieve data. In this case, register device 114 may send "dummy" data 212 to host memory controller 106 until register device 114 receives data from memory devices 116.

Dummy data 212 is not actually the data 214 that host memory controller 106 requests, but rather is unrelated data generated or identified by the register device 114. In an embodiment, dummy data 212 is not, for example, data that any host memory controller requested register device 114 to store. In an embodiment, dummy data 212 may be any combination of predefined sequences of bits and/or random patterns of binary values of 0's and 1's. Dummy data 212 may be discarded upon receipt by host memory controller 106.

In an embodiment, dummy data 212 may be transferred during "dummy" cycles 216 immediately after host read latency 208 has elapsed up until the clock cycles in which the actual requested data becomes accessible to the register device 114. The number of dummy cycles 216 may be predetermined to be a predefined number of clock cycles used by both register device 114 and host memory controller 106. For example, the number of dummy cycles 216 may be, but are not limited to, 16 clock cycles, 17 clock cycles, and so forth.

In an embodiment, dummy data 212 can include a unique pattern of a combination of binary values of 0's and 1's. Upon detecting this unique pattern in a set of data returned to the host memory controller 106, host memory controller 106 may recognize the returned set of data as being dummy data 212 and not actual data 214.

Immediately after dummy data 212 is sent, register device 114 may send read data 210 that includes the actual data 214 that is requested via read transaction 202. Actual data 214 is sent to host memory controller 106 upon the data retrieved from memory devices 116 becoming readily available to register device 114. Read data 210 may be generated by multiplexing between dummy data 212 and actual data 214.

Some or all of the host read latency 208, the number of dummy cycles 216, or even the dummy data 212 itself may be configurable. For example, the host read latency 208, the number of dummy cycles 216, or the dummy data 212 can be configured during a hardware power-on-reset (POR) or programmed using internal registers of register device 114. The internal registers can be programmed after a POR and before any memory transfer occurs between host memory controller 106 and register device 114.

As an example, the host read latency 208, the number of dummy cycles 216, or the dummy data 212 may be configured during a hardware POR using a hardware pin-strapping method or any other hardware configuration methods. An example of the hardware pin-strapping method is implemented by driving input ports of host memory controller 106 with predefined values. Host memory controller 106 asynchronously captures the values using an inactive edge of a POR signal. For example, an inactive edge may be a positive edge of an active-low POR signal.

3.2. Read Transaction with Multiple Bursts

Figure 3:
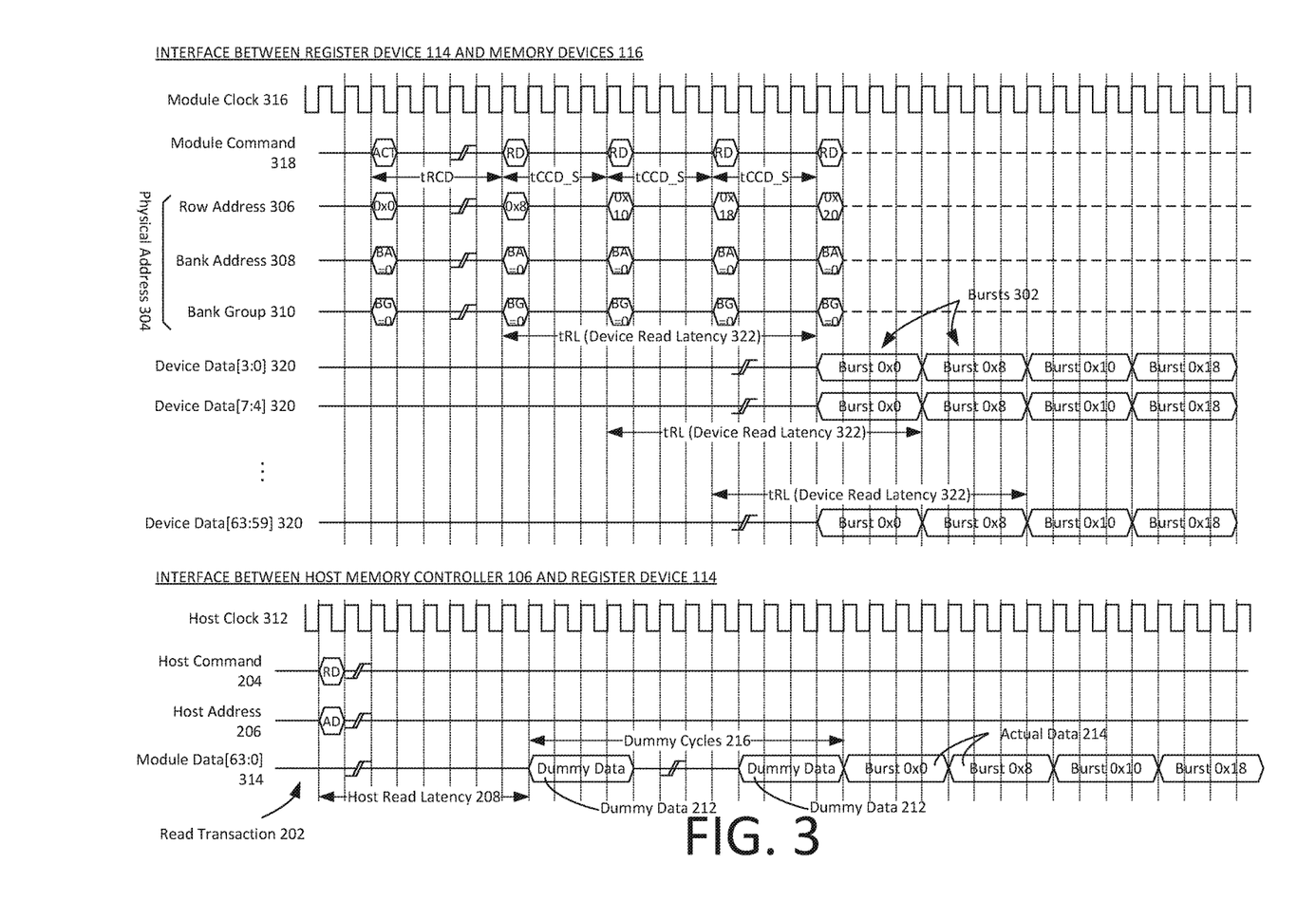
FIG. 3 is an example timing diagram of a read transaction with multiple bursts, according to an embodiment.

FIG. 3 is an example timing diagram of read transaction 202 with multiple bursts 302, according to an embodiment. FIG. 3 is only one example of a manner in which a read transaction may be conducted in accordance with the described techniques. In other embodiments, read transactions may be conducted using process flows that include fewer or additional elements, with different timings and/or arrangements.

A burst 302 may include data transferred on a data bus using a predefined number of consecutive clock edges or consecutive clock cycles. Data in bursts 302 may be transferred using positive edges, negative edges, or a combination of positive and negative edges of a clock. Multiple bursts 302 may be consecutively transferred, with one burst 302 right after another burst 302 to transfer a contiguous block of memory data.

Read transaction 202 may be implemented using any memory transfer protocols.

For example, read transaction 202 may be implemented using, without limitation, a DDR type four (DDR4) SDRAM memory read access timing or any other memory bus protocol.

For illustrative purposes, FIG. 3 depicts a timing diagram example. The bottom of FIG. 3 depicts waveforms of signals in an interface between host memory controller 106 and register device 114. The top of FIG. 3 depicts waveforms of signals in an interface between register device 114 and memory devices 116.

Register device 114 may not convert any memory addresses. Register device 114 may send physical address 304 to memory devices 116. Physical address 304 may be based on host address 206. For example, physical address 304 may be generated by registering host address 206 using a storage element. For example, host address 206 may be registered using a clock and a storage device, such as a flip-flop, a latch, or any other storage unit. Register device 114 inputs physical address 304 to memory devices 116 by driving a combination of input ports of memory devices 116, such as a row address 306, a bank address 308, a bank group 310, etc. Row address 306, bank address 308, the bank group 310 will be described in more details in a subsequent figure.

In the bottom of FIG. 3, the interface between host memory controller 106 and register device 114 includes a host clock 312, a host command 204, a host address 206, and module data 314. Host clock 312 is used to send or receive signals transferred between host memory controller 106 and register device 114. Host command 204 is used for host memory controller 106 to instruct register device 114. For example, host command 204 may be used for host memory controller 106 to instruct register device 114 to read (RD) data from memory devices 116. Host address 206, denoted as AD, may be the physical address of the memory address space of computing device 102.

Module data 314 includes data transferred between host memory controller 106 and register device 114. For example, module data 314 may include read data 210 transferred from register device 114 to host memory controller 106. Upon receiving a host command 204 from host memory controller 106 that initiates a read transaction 202, register device 114 waits for a number of clock cycles specified by host read latency 208 before register device 114 sends read data 210 to host memory controller 106. Read data 210 may initially include dummy data 212 for a number of bursts 302 of dummy cycles 216. Immediately after the number of dummy cycles 216, read data 210 may include actual data 214. Register device 114 can send a number of bursts 302 of actual data 214.

For illustrative purposes, module data 314 is shown as a 64-bit bus, although it is understood that module data 314 may include any number of bits. For example, module data 314 may include 72 bits, with 64 bits of data and 8 bits of error correction code (ECC).

In the top of FIG. 3, the interface between register device 114 and memory devices 116 may include a module clock 316, a module command 318, physical address 304, and device data 320. Module clock 316 is used to send or receive signals transferred between register device 114 and memory devices 116. Module command 318 may be used for register device 114 to instruct memory devices 116 to perform a number of operations.

For example, module clock 316 may be the same as or different from host clock 312. When module clock 316 is different from host clock 312, module clock 316 may have the same frequency but a different phase as host clock 312. When module clock 316 is different from host clock 312, module clock 316 may have a different frequency than host clock 312.

For example, module command 318 may be used to instruct memory devices 116 to activate (ACT) a row of in a bank of memory cells, initiate a read (RD) burst for an activated row, initiate a write burst for an activated row, precharge to close an activated row in a bank, start a refresh operation to preserving information in memory cells, load internal programmable mode registers of memory devices 116, and so forth. Also, for example, the mode registers may be programmed to configure a Column Access Strobe (CAS) latency, a burst length, and so forth. Further, for example, the mode registers may be programmed using a serial interface, including, but not limited to, an Inter-Integrated Circuit (I2C) or any other serial computer bus protocols.

Physical address 304 points to a physical location in memory devices 116. Physical address 304 may include, for example, a row address 306, a bank address 308, and/or a bank group 310, of memory devices 116. Row address 306 refers to a specific row of memory cells. Bank address 308 refers to a specific bank with a number of rows of memory cells in the bank. Bank group 310 refers to a specific group of banks of memory cells.

Memory devices 116 may have a number of timing parameters, such as a row-to-column delay ($t_{RCD}$), a column to column command delay ($t_{CCD}$), a read latency ($t_{RL}$), etc. Once a row has been activated or opened, read or write commands may be performed to that row after a minimum amount of time, called a row-to-column delay ($t_{RCD}$). A minimum column-to-column command delay ($t_{CCD}$) occurs between consecutive commands. Bank accesses to different bank groups have a $t_{CCD\_S}$ (or short) delay between commands while bank accesses within the same bank group have a $t_{CCD\_L}$ (or long) delay between commands. Requested data from memory devices 116 may be available on device data 320 after a read latency ($t_{RL}$) since the time the read command is received by memory devices 116.

Host command 204 is used by register device 114 to generate module command 318. For example, host command 204 for a particular host address 206 may instruct register device 114 to generate module command 318 that instructs memory devices 116 to perform a refresh command to close an open page, and then an activate command to open a specific page associated with requested host address 206. The refresh command may be followed by a read or write command starting at a specific physical address 304 for a number of bursts 302 of device data 320.

For illustrative purposes, device data 320 is shown using a 64-bit bus, although it is understood that device data 320 may include any number of bits. For example, device data 320 may include 72 bits, with 64 bits of data and 8 bits of error correction code (ECC).

In a transaction between host memory controller 106 and memory module 104, only host memory controller 106 may function as a master that has control of reads/writes. Memory module 104 may function as a slave that simply follows instructions from the master. Register device 114 or memory devices 116 may function as a slave that receives a command and receives/sends data from/to the master.

In an embodiment, to resolve slowness resulting from, for example, the time taken by memory devices 116, register device 114 or memory devices 116 may start decoding a read or write command as soon as register device 114 or memory devices 116 receive a row activation (ACT) command from host memory controller 106. There may be an agreement between application software 112 and a slave controller, such as register device 114, that all read and write commands may be aligned to a row of memory cells in memory devices 116. For example, host address 206 may include only addresses that are aligned to, or granular rows of memory cells in, memory devices 116 such that each memory transaction applies to an entire row of memory cells in memory devices 116.

This translation of aligning host address 206 to a row address may be handled in a software layer, such as application software 112, etc., according to a setting or a programmable configuration of memory module 104. For example, memory module 104 may be configured to include a size or a number of bytes of a row in memory devices 116. Since host address 206 may be aligned to a row address, an address of a column can be ignored by register device 114 or memory devices 116.

In an embodiment, a read or write command is decoded by memory devices 116 right after an ACT command. Since the read or write command is decoded right after the ACT command, an address of the read or write command may be integrated into the ACT command. As an example, when host command 204 is an activation command, host address 206 having a range from 0 to 8191 may be dedicated to or reserved only for a write (WR) transaction, a range from 8192 to 16383 may be dedicated to or reserved only for read (RD) transaction 202, etc. As another example, an address range that has been reserved for RD may be an alias of an address range that has been reserved for WR. For example, an address range that is an alias of another address range, without limitation, may have only upper address bits different from those of the other address range, and both of these address ranges may have the same lower address bits.

In an embodiment, a number of host commands 204, such as Refresh, Precharge, ZQ calibration, etc. can be ignored. These host commands 204 may not break a memory transfer protocol. For instance, before a refresh operation, host memory controller 106 can close a row and reopen a row after an Auto-Refresh Command period ($t_{RFC}$) is over.

By design, host memory controller 106 can accept only a maximum host read latency 208. The maximum host read latency 208 may be any number of cycles of host clock 312. For example, the maximum of host read latency 208 may be 16 or 17 memory clock cycles, or any other number of memory clock cycles.

In an embodiment, some or all of the host read latency 208, a number of dummy cycles 216, and the dummy data 212, are configurable. For example, the parameters may be configured using a load mode register (LMR) command sent from host memory controller 106 to register device 114. Also, for example, these parameters may be configured using a serial interface, such as I2C or any other serial protocol, to read configuration information from a programmable device (e.g., Electrically Erasable Programmable Read-Only Memory (E2PROM), etc.) and program internal registers of host memory controller 106 and register device 114.

Upon receiving host command 204 and host address 206 from host memory controller 106, register device 114 prepares to interface with memory devices 116 to retrieve read data 210 out of memory devices 116. Memory devices 116 may take a specific amount of time, such as a device read latency 322, before outputting device data 320 to register device 114. Device read latency 322 may be greater than host read latency 208.

For example, memory devices 116 may take an amount of time to decode the physical address 304 that the memory devices 116 receive from register device 114, decode module command 318, or determine a column address where actual data 214 is stored. For certain types of memories (e.g., flash memory, etc.), the amount of time before memory devices 116 can send read data 210 to register device 114, may be greater than host read latency 208.

For illustrative purposes, FIG. 3 depicts register device 114 opening a row using an activate (ACT) command and issuing a number (e.g. 4) of read commands on module command 318 bus. After $t_{RCD}$, register device 114 sends a number of read (RD) or write (WR) commands for a number of bursts 302.

Register device 114 may be implemented with the block access protocol using a predefined burst size or length for each burst 302. A burst size may be of any number of bytes or words. For example, each burst 302 may have 8 words, or any other number of words.

Each RD command may be sent in a module command 318 for a physical address 304 that is aligned to a row address. A burst 302 of device data 320 may be sent for each RD command. For illustrative purposes, row address 306 may be a value that is a factor of 8, or any other value. For illustrative purposes, row address 306 may be 0x0, 0x8, 0x10, etc.

Each word may be of any number of bits. For example, a word may be 64 bits of data. Also, for example, a word may be 72 bits, of which 64 bits are for data and 8 bits for (error correction code) ECC.

3.3. Read Transaction with Multiple Rows

Figure 4:
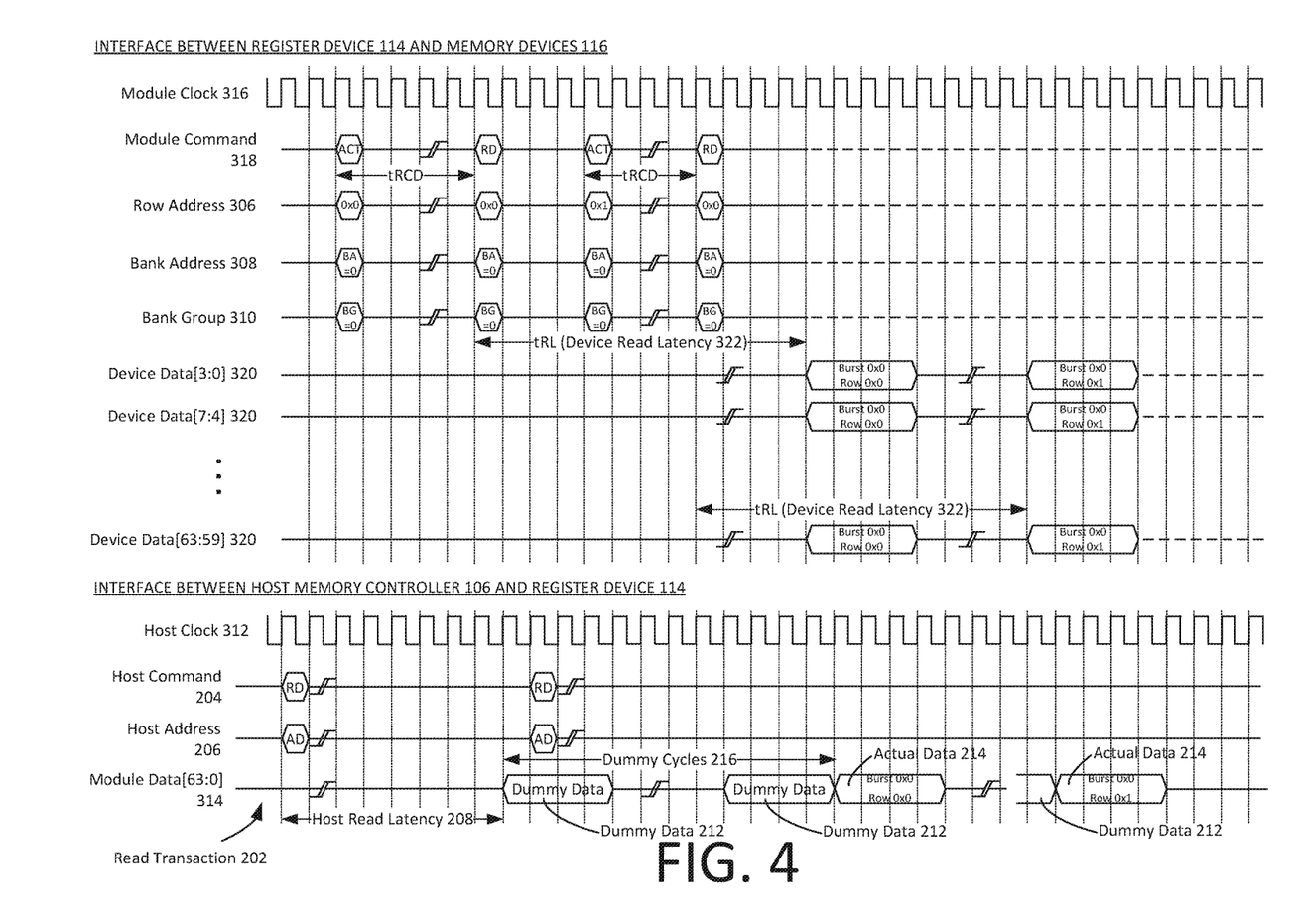
FIG. 4 is an example of a timing diagram of a read transaction with multiple rows, according to an embodiment.

FIG. 4 is an example of a timing diagram of a read transaction 202 with multiple rows, according to an embodiment. FIG. 4 is only one example of a manner in which a read transaction may be conducted in accordance with the described techniques. In other embodiments, read transactions may be conducted using process flows that include fewer or additional elements, with different timings and/or arrangements.

Read transaction 202 is implemented for a row aligned memory access. For illustrative purposes, the example depicts a sample timing of two bursts 302 on row 0x0 and row 0x1. The bottom of FIG. 4 depicts waveforms of signals in an interface between host memory controller 106 and register device 114. The top of FIG. 4 depicts waveforms of signals in an interface between register device 114 and memory devices 116.

Register device 114 may not do any actions on its own and thus may only accept commands from host memory controller 106. Upon receiving a first host command 204 and a first host address 206 from host memory controller 106 for a first read transaction 202, register device 114 sends a first module command 318 and a first physical address 304 to memory devices 116. For example, the first module command 318 and the first physical address 304 may include the same information as in the first host command 204 and the first host address 206 but delayed one or more clock cycles of module clock 316. The first module command 318 may include a first ACT command sent to memory devices 116. The first physical address 304 may be sent to memory devices 116 for memory devices 116 to identify and activate or open a first row of memory cells. The first physical address 304 may include a row address 306, a bank address 308, and a bank group 310. After a period of $t_{RCD}$ from the time when the first ACT command is sent, a first RD command may be sent on the first module command 318 to memory devices 116. The first RD command instructs memory devices 116 to read data starting at the first row of memory cells at a physical location identified by the first physical address 304.

Upon receiving a second host command 204 and a second host address 206 from host memory controller 106 for a second read transaction 202, register device 114 sends a second module command 318 and a second physical address 304 to memory devices 116. For example, the second module command 318 and the second physical address 304 may include the same information as in the second host command 204 and the second host address 206 but delayed one or more clock cycles of module clock 316. The second read transaction 202 may be conducted to a second row in the same bank with the first row that was activated for the first read transaction 202 above. The second read transaction 202 occurs immediately after the first read transaction 202 without any other transactions in between the read transactions. The second module command 318 may include a second ACT command sent to memory devices 116. The second physical address 304 may be sent to memory devices 116 for memory devices 116 to identify and activate or open a second row of memory cells. The second physical address 304 may include a second row address 306, and the same bank address 308, and the same bank group 310 as the first physical address 304 above. After a period of $t_{RCD}$ from the time when the second ACT command is sent, a second RD command to be sent on the second module command 318 to memory devices 116. The second RD command instructs memory devices 116 to read data starting at the second row of memory cells at a physical location identified by the second physical address 304.

In an embodiment, the second ACT command may be interleaved between the first RD command and the second RD command. The second ACT command may be interleaved to activate or open the second row in the same bank address 308 and the same bank group 310. In this case, the bank identified by the bank address 308 and the bank group 310 may have more than one row activated or opened. Thus, the first row may not have to be pre-charged or closed prior to activating or opening the second row in the same bank address 308 and the same bank group 310. This is different from standard memory controllers because, for example, the standard memory controllers do not interleave ACT commands to activate or open multiple rows in the same bank.

Upon receiving a host command 204 from a host memory controller 106 that initiates a read transaction 202, register device 114 sends an activate command on module command 318. After $t_{RCD}$, register device 114 sends a read command on module command 318.

Register device 114 may wait for a number of clock cycles specified by host read latency 208 before register device 114 sends read data 210 to host memory controller 106. Read data 210 may initially include dummy data 212 for a number of dummy cycles 216. Immediately after the number of bursts 302 of dummy cycles 216, read data 210 includes actual data 214. Register device 114 may send a burst 302 of actual data 214.

Upon receiving another host command 204 from host memory controller 106 that initiates another read transaction 202, register device 114 sends an activate command on module command 318, and after $t_{RCD}$, register device 114 sends a read command on module command 318.

Register device 114 waits for a number of clock cycles specified by host read latency 208 before register device 114 sends read data 210 to host memory controller 106. Read data 210 may initially include dummy data 212 for a number of dummy cycles 216. Immediately after the number of bursts 302 of dummy cycles 216, read data 210 includes actual data 214. Register device 114 may send a burst 302 of actual data 214.

3.4. Single-Columned Memory Device

Figure 5:
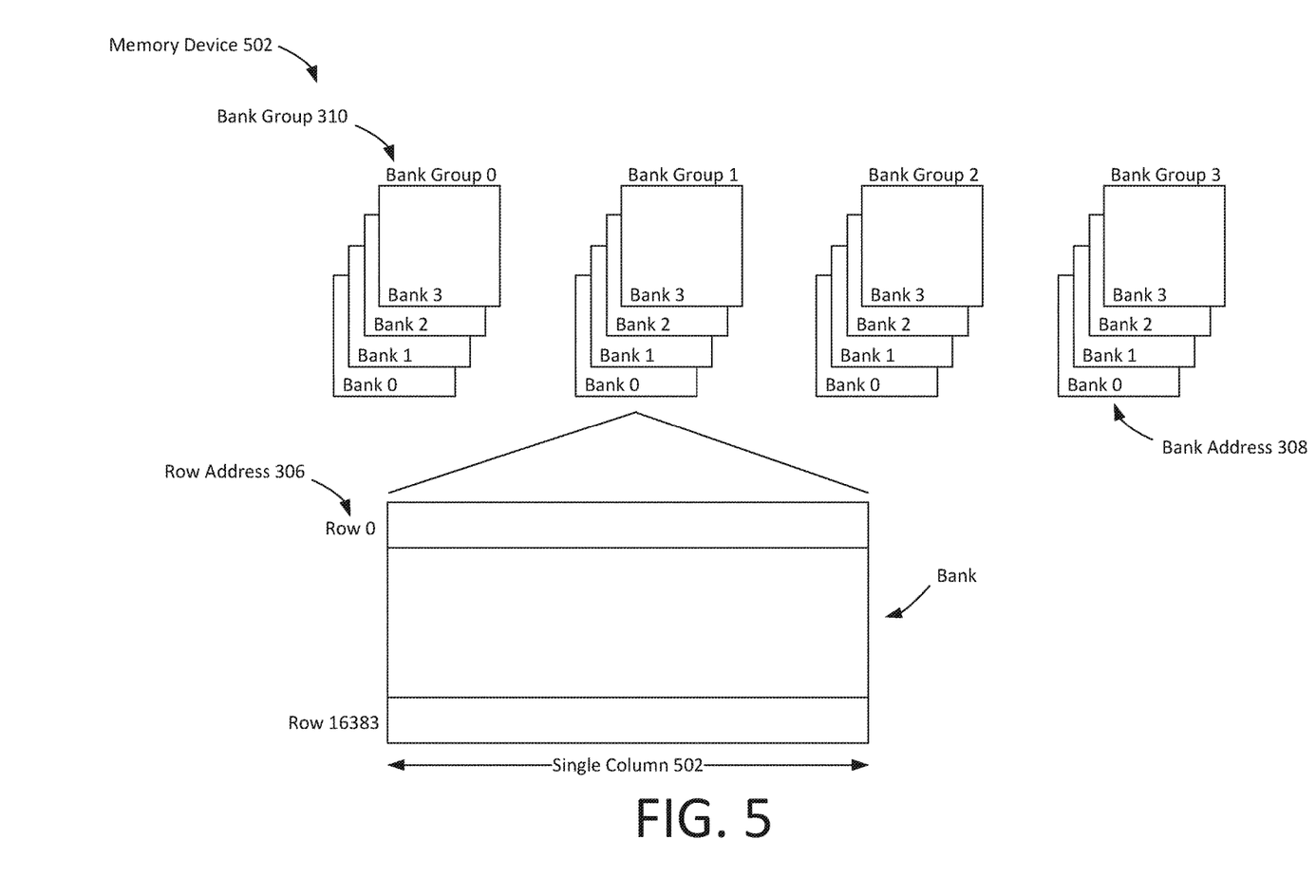
FIG. 5 is an example diagram of a memory device, according to an embodiment.

FIG. 5 is an example diagram of a memory device 502, according to an embodiment. The diagram depicts an example of a structure or geometry of memory device 502. For example, the diagram depicts a device structure of a SDRAM (e.g., DDR4, etc.). Of course, similar structures or geometries may be applied to other types of memories. Also, for example, memory device 502 may be memory device 116.

Memory device 502 includes row address 306, bank address 308, and bank group 310. Row address 306 identifies a physical location of a row of memory cells in a bank. Bank address 308 identifies a physical bank of rows of memory cells. Bank group 310 can identify a group of banks. For illustrative purposes, the diagram depicts memory device 502 as having 16,384 rows, 4 banks, and 4 bank groups, although memory device 502 may in fact have any number of rows, any number of banks, and any number of bank groups.

In an embodiment, each bank has only a single column 502 of memory cells. Single column 502 does not require any decoding of column addresses. Since the geometry of memory device 502 has just one column, CAS latency cycles do not occur during read operations. This drastically reduces the latency values. This is different from other memory device structures with multiple columns. Having multiple columns would require an address to be of (Row, Column) format. Each address decoding takes more memory cycles, especially the decoding of the column addresses.

It would be practically difficult in the current memory designs to achieve high capacity memory with just one column at least because it requires a substantial number of rows to be implemented. The current memory devices have a dependency on the legacy factors and so changing the geometry of the current memory devices would have potential conflicts with the existing host memory controller designs.

In an embodiment, when memory device 502 includes only one column 502, read data 210 may not have to include dummy data 212 for read operations. Having memory device 502 with just one column 502 itself is another way to address the read latency issue.

3.5. Example Process Flow Utilizing Dummy Data

Figure 6:
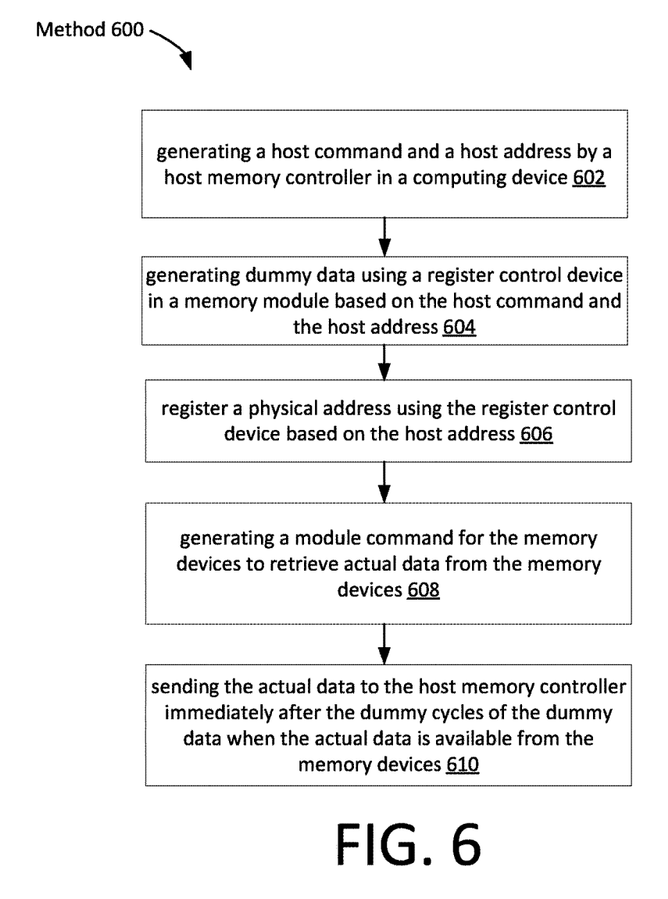
FIG. 6 is an example process flow, in accordance with one or more embodiments.

FIG. 6 illustrates an example process flow 600 for utilizing dummy data, in accordance with one or more embodiments. Flow 600 may be implemented, for example, in a computer system such as system 100. FIG. 6 illustrates only one possible flow for practicing the described techniques. Other embodiments may include fewer, additional, or different elements, in varying arrangements. Moreover, it will be recognized that the sequence of blocks is for convenience in explaining the process flow only, as the blocks themselves may be performed in various orders and/or concurrently.

In block 602, a host memory controller, such as host memory controller 106, in a computing device generates a host command, such as host command 204, and a host address, such as host address 206.

In block 604, the system can generate dummy data, such as dummy data 212, using a register device, such as register device 114, in a memory module, such as memory module 104. The system can generate the dummy data based on the host command and the host address. The register device can send a number of bursts, such as bursts 302, of the dummy data at or before a host read latency, such as host read latency 208, has elapsed since the time when the register device receives the host command and the host address.

In block 606, the system can register a physical address, such as physical address 304, using the register device based on the host address. The physical address can be decoded from the host address. The physical address can include a row address (e.g., a row address 306), a bank address (e.g., a bank address 308), a bank group (e.g., a bank group 310), etc. The register device can continue to send the dummy data for a number of dummy cycles, such as dummy cycles 216, until actual data, such as actual data 214, is available from memory devices, such as memory devices 116.

In block 608, the register device can generate a module command, such as module command 318, for the memory devices to retrieve actual data from the memory devices. The actual data is stored starting at the physical address that the host memory controller requests for a read transaction, such as read transaction 202. The row address, the bank address, the bank group, etc. can be used by the memory devices to retrieve the actual data.

In block 610, the register device can send the actual data to the host memory controller immediately after the dummy cycles of the dummy data when the actual data is available from the memory devices. The register device can send bursts, such as bursts 302, of the actual data to the host memory controller.

4.0. Example Embodiments

Examples of some embodiments are represented, without limitation, in the following clauses:

According to an embodiment, a system comprises: a memory device; and a register device configured to receive a host command and a host address, generate a module command and a physical address for a read transaction upon receiving the host command and the host address, send the module command and the physical address to the memory device, and send the actual data to the host memory controller when the actual data is available from the memory device.

In an embodiment, the register device is further configured to send dummy data to a host memory controller while the memory device retrieves actual data at the physical address.

In an embodiment, the register device is further configured to send the dummy data after a number of clock cycles specified by a host read latency.

In an embodiment, the actual data is available from the memory device after a device read latency has elapsed starting from a time when the memory device receives the module command.

In an embodiment, the register device is further configured to generate a first activate command, a first read command, a second activate command, and a second read command, and send the first activate command, the first read command, the second activate command, and the second read command to the memory device, the second activate command interleaved between the first read command and the second read command when the second activate command is sent.

In an embodiment, the host address is in a range of addresses that are predefined for the read operation.

In an embodiment, the register device is further configured to send a burst of the dummy data from consecutive addresses of the memory device.

In an embodiment, the actual data is available from the memory device after a device read latency has elapsed, the device read latency greater than a host read latency of the host memory controller.

In an embodiment, the register device is further configured to generate a first read transaction and a second read transaction, and send the second read transaction to the memory device immediately after the first read transaction, the first read transaction and the second read transaction conducted for the same bank in the memory device.

In an embodiment, the host address is aligned to a row of memory cells in the memory device.

In an embodiment, the register device is further configured using a block access protocol.

In an embodiment, the memory device is a double data rate (DDR) synchronous dynamic random-access memory (SDRAM), a flash memory, or a combination thereof.

In an embodiment, the dummy data is unrelated to data that the host memory controller requests the register device to store.

In an embodiment, the host command is received after the host address is received by the register device.

In an embodiment, the physical address includes a row address, a bank address, and a bank group of the memory device.

According to an embodiment, a memory module comprising: a memory device having a single column of memory cells; and a memory controller configured to interface with the memory device.

In an embodiment, the memory device includes only the single column in each row in a bank of the memory cells.

According to an embodiment, a method comprising: receiving a host command and a host address from a host memory controller, the host command and the host address being for a read transaction; generating a module command and a physical address by a register device, the module command and the physical address generated for the read transaction upon the register device receiving the host command and the host address; sending the module command and the physical address to a memory device; sending dummy data by the register device to the host memory controller while the memory device retrieves actual data at the physical address; and sending the actual data by the register device to the host memory controller when the actual data is available from the memory device.

In an embodiment, the host address is in a range of addresses that are predefined for a read operation.

In an embodiment, wherein sending the dummy data includes sending a burst of the dummy data to the host memory controller after a number of clock cycles specified by a host read latency.

In an embodiment, wherein the memory device includes only a single column in each row in a bank of memory cells.

In an embodiment, wherein the actual data is available from the memory device after a device read latency has elapsed starting from a time when the memory device receives the module command, and the device read latency is greater than a host read latency of the host memory controller.

In an embodiment, the method further comprises: generating a first activate command, a first read command, a second activate command, and a second read command, the first activate command and the second activate command generated for the same bank in the memory device; and sending the first activate command, the first read command, the second activate command, and the second read command to the memory device, the second activate command interleaved between the first read command and the second read command when the second activate command is sent.

Other examples of these and other embodiments are found throughout this disclosure.

5.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system comprising:
   a memory device; and
   a register device configured to receive a host command and a host address, generate a module command and a physical address for a read transaction upon receiving the host command and the host address, send the module command and the physical address to the memory device, send dummy data to a host memory controller while the memory device retrieves actual data at the physical address, and send the actual data to the host memory controller when the actual data is available from the memory device.

2. The system as recited in claim 1, wherein the register device is further configured to send the dummy data after a number of clock cycles specified by a host read latency.

3. The system as recited in claim 1, wherein the actual data is available from the memory device after a device read latency has elapsed starting from a time when the memory device receives the module command.

4. The system as recited in claim 1, wherein the register device is further configured to generate a first activate command, a first read command, a second activate command, and a second read command, and send the first activate command, the first read command, the second activate command, and the second read command to the memory device, the second activate command interleaved between the first read command and the second read command when the second activate command is sent.

5. The system as recited in claim 1, wherein the host address is in a range of addresses that are predefined for the read operation.

6. The system as recited in claim 1, wherein the register device is further configured to send a burst of the dummy data from consecutive addresses of the memory device.

7. The system as recited in claim 1, wherein the actual data is available from the memory device after a device read latency has elapsed, the device read latency greater than a host read latency of the host memory controller.

8. The system as recited in claim 1, wherein the register device is further configured to generate a first read transaction and a second read transaction, and send the second read transaction to the memory device immediately after the first read transaction, the first read transaction and the second read transaction conducted for the same bank in the memory device.

9. The system as recited in claim 1, wherein the host address is aligned to a row of memory cells in the memory device.

10. The system as recited in claim 1, wherein the register device is further configured using a block access protocol.

11. The system as recited in claim 1, wherein the memory device is a double data rate (DDR) synchronous dynamic random-access memory (SDRAM), a flash memory, or a combination thereof.

12. The system as recited in claim 1, wherein the dummy data is unrelated to data that the host memory controller requests the register device to store.

13. A method comprising:
   receiving a host command and a host address from a host memory controller, the host command and the host address being for a read transaction;
   generating a module command and a physical address by a register device, the module command and the physical address generated for the read transaction upon the register device receiving the host command and the host address;
   sending the module command and the physical address to a memory device;
   sending dummy data by the register device to the host memory controller while the memory device retrieves actual data at the physical address; and
   sending the actual data by the register device to the host memory controller when the actual data is available from the memory device.

14. The method as recited in claim 13, wherein the host address is in a range of addresses that are predefined for a read operation.

15. The method as recited in claim 13, wherein sending the dummy data includes sending a burst of the dummy data to the host memory controller after a number of clock cycles specified by a host read latency.

16. The method as recited in claim 13, wherein the memory device includes only a single column of single level cell memory cells in each row in a bank of memory cells.

17. The method as recited in claim 13, wherein the actual data is available from the memory device after a device read latency has elapsed starting from a time when the memory device receives the module command, and the device read latency is greater than a host read latency of the host memory controller.

18. The method as recited in claim 13, further comprising:
generating a first activate command, a first read command, a second activate command, and a second read command, the first activate command and the second activate command generated for the same bank in the memory device; and
sending the first activate command, the first read command, the second activate command, and the second read command to the memory device, the second activate command interleaved between the first read command and the second read command when the second activate command is sent.

* * * * *